United States Patent
Ando (10) Patent No.: US 11,330,125 B2
(45) Date of Patent: May 10, 2022

(54) IMAGE FORMING APPARATUS WITH AN ADJUSTABLE SCANNER

(71) Applicant: TOSHIBA TEC KABUSHIKI KAISHA, Tokyo (JP)

(72) Inventor: Koichi Ando, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/989,980

(22) Filed: Aug. 11, 2020

(65) Prior Publication Data

US 2022/0053103 A1    Feb. 17, 2022

(51) Int. Cl.
*H04N 1/04* (2006.01)
*H04N 1/00* (2006.01)
*H04N 1/10* (2006.01)

(52) U.S. Cl.
CPC ..... *H04N 1/00559* (2013.01); *H04N 1/00538* (2013.01); *H04N 1/1017* (2013.01); *H04N 2201/0422* (2013.01); *H04N 2201/0428* (2013.01)

(58) Field of Classification Search
CPC .......... H04N 1/00562; H04N 1/00559; H04N 1/00538; H04N 1/1017; H04N 2201/0422; H04N 2201/0428
USPC ........ 358/474, 496, 497, 498, 401; 399/211, 399/212, 364, 367, 379, 380
See application file for complete search history.

(56) References Cited

U.S. PATENT DOCUMENTS

| | | | | |
|---|---|---|---|---|
| 4,971,177 A | * | 11/1990 | Nojiri | G01G 19/4144 177/245 |
| 7,855,813 B2 | * | 12/2010 | Yamada | H04N 1/00519 358/474 |
| 2005/0094218 A1 | * | 5/2005 | Ando | H04N 1/1017 358/474 |
| 2014/0185112 A1 | * | 7/2014 | Nakayama | H04N 1/00549 358/498 |

FOREIGN PATENT DOCUMENTS

| | | | |
|---|---|---|---|
| JP | 2007-067517 | | 3/2007 |
| JP | 2007328204 A | * | 12/2007 |
| JP | 2009-260649 | | 11/2009 |

* cited by examiner

*Primary Examiner* — Cheukfan Lee
(74) *Attorney, Agent, or Firm* — Amin, Turocy & Watson, LLP (57) ABSTRACT

According to an embodiment, an image forming apparatus includes a scanner unit, an image forming unit, a frame, a first adjustment mechanism, and a second adjustment mechanism. The scanner unit has an image reading section. The image forming unit forms an image read by the scanner unit on a sheet. The frame includes a first support section and a second support section. The first support section supports the image forming unit. The second support section is positioned below the scanner unit. The first adjustment mechanism steplessly adjusts a distance in an up-down direction between the scanner unit and the second support section. The second adjustment mechanism gradually adjusts the distance in the up-down direction between the scanner unit and the second support section.

18 Claims, 9 Drawing Sheets

IMAGE FORMING APPARATUS WITH AN ADJUSTABLE SCANNER

FIELD

Embodiments described herein relate generally to an image forming apparatus.

BACKGROUND

An image forming apparatus that forms an image on a sheet is used. The image forming apparatus includes a scanner unit and an image forming unit. The scanner unit has an image reading section that reads an image of a copy target. The image forming unit forms an image read by the scanner unit. An image forming apparatus is required to suppress deterioration of the quality of an image to be formed.

DETAILED DESCRIPTION

In general, according to an embodiment, an image forming apparatus includes a scanner unit, an image forming unit, a frame, a first adjustment mechanism, and a second adjustment mechanism. The scanner unit has an image reading section. The image forming unit forms an image read by the scanner unit on a sheet. The frame includes a first support section and a second support section. The first support section supports the image forming unit. The second support section is positioned below the scanner unit. The first adjustment mechanism steplessly adjusts a distance in an up-down direction between the scanner unit and the second support section. The second adjustment mechanism gradually adjusts the distance in the up-down direction between the scanner unit and the second support section.

Hereinafter, the image forming apparatus according to an embodiment will be described with reference to the drawings.

Figure 1:
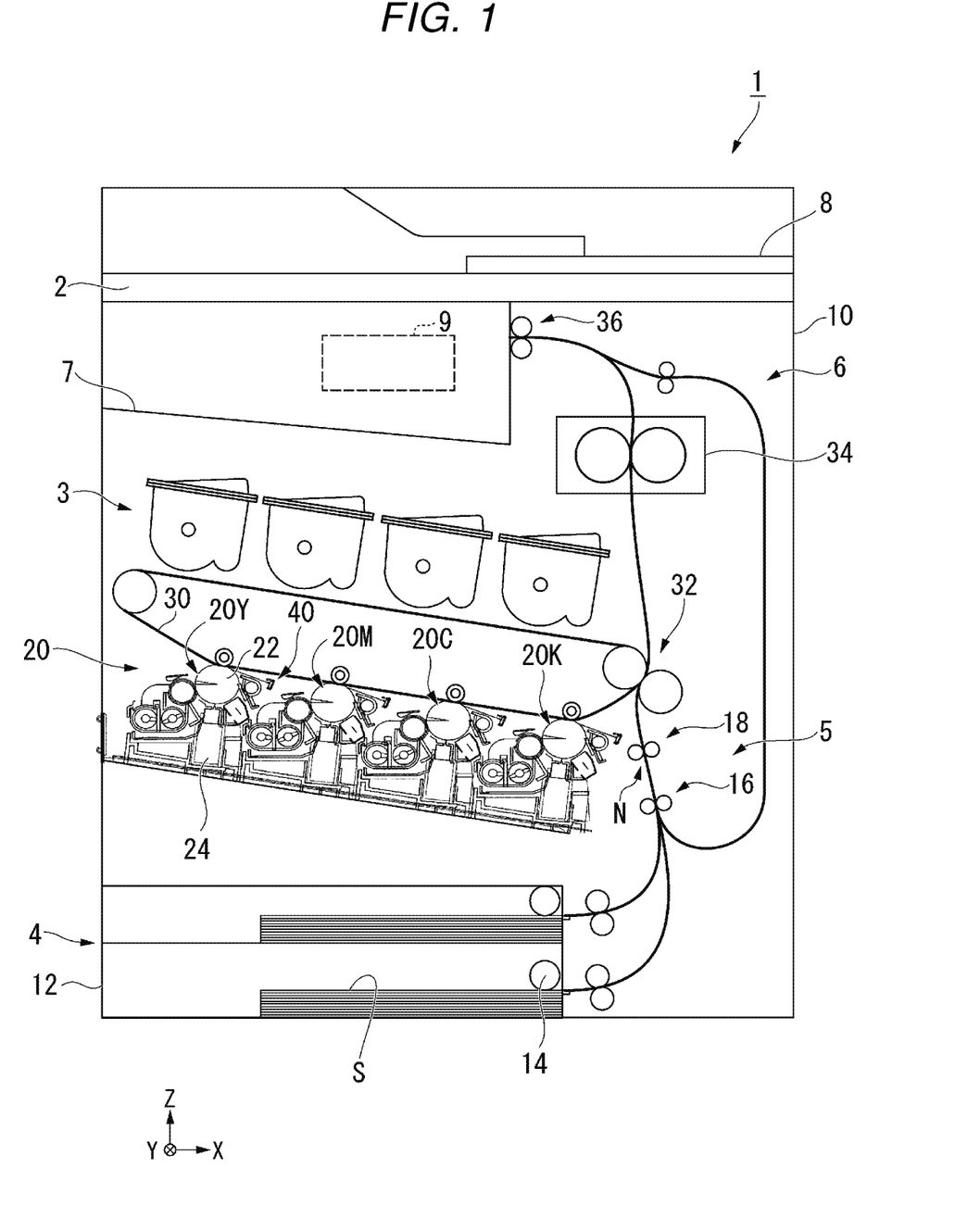
FIG. 1 is a schematic configuration view of an image forming apparatus according to an embodiment.

FIG. 1 is a schematic configuration view of the image forming apparatus according to the embodiment. In the present application, the Z direction, the X direction, and the Y direction of a rectangular coordinate system are defined as follows. The Z direction is a vertical direction and the +Z direction is an upward direction. The X direction and the Y direction are horizontal directions. The X direction is a width direction of the image forming apparatus. The +X direction is a right direction toward the image forming apparatus. The Y direction is a depth direction of the image forming apparatus. The +Y direction is a direction from the near part to the far part of the image forming apparatus.

The image forming apparatus 1 performs a process of forming an image on a sheet S. The sheet S may be paper. The image forming apparatus 1 includes a housing 10, a scanner unit 2, an image forming unit 3, a sheet supply section 4, a conveying section 5, a discharge tray 7, a reversing unit 6, a control panel 8, and a control section 9.

The housing 10 forms the outer shape of the image forming apparatus 1.

The scanner unit 2 reads image information of a copy target as light and darkness of light and generates an image signal. The scanner unit 2 outputs the generated image signal to the image forming unit 3.

The image forming unit 3 forms a toner image based on an image signal from the scanner unit 2 or the outside. A toner image is an image formed with toner or other material. The image forming unit 3 transfers the toner image onto the front surface of the sheet S. The image forming unit 3 heats and pressurizes the toner image on the front surface of the sheet S to fix the toner image onto the sheet S.

The sheet supply section 4 supplies the sheets S one by one to the conveying section 5 at the timing when the image forming unit 3 forms the toner image. The sheet supply section 4 includes a sheet accommodation section 12 and a pickup roller 14.

The sheet accommodation section 12 stores a sheet S of a predetermined size and type.

The pickup roller 14 takes out the sheets S one by one from the sheet accommodation section 12. The pickup roller 14 supplies the taken-out sheet S to the conveying section 5.

The conveying section 5 conveys the sheet S supplied from the sheet supply section 4 to the image forming unit 3. The conveying section 5 has a conveying roller 16 and a registration roller 18.

The conveying roller 16 conveys the sheet S supplied from the pickup roller 14 to the registration roller 18. The conveying roller 16 makes the distal end of the sheet S in the conveying direction hit on a nip N of the registration roller 18.

The registration roller 18 bends the sheet S at the nip N to adjust the position of the distal end of the sheet S in the conveying direction. The registration roller 18 conveys the sheet S corresponding to the timing when the image forming unit 3 transfers the toner image to the sheet S.

The image forming unit 3 will be described.

The image forming unit 3 includes a plurality of image forming sections 20, an exposure device 24, an intermediate transfer belt 30, a transfer section 32, and a fixing device 34.

The image forming section 20 has a photoreceptor drum 22. The image forming section 20 forms a toner image according to the image signal on the photoreceptor drum 22. The plurality of image forming sections 20Y, 20M, 20C, and 20K form toner images by yellow, magenta, cyan, and black toners, respectively.

A charging device charges the front surface of the photoreceptor drum 22. A developing device contains a developer containing yellow, magenta, cyan, and black toners. The developing device develops an electrostatic latent image on the photoreceptor drum 22 to form a toner image of each color on the photoreceptor drum 22.

The exposure device 24 scans the charged photoreceptor drum 22 with light to expose the photoreceptor drum 22. The exposure device 24 exposes the photoreceptor drum 22 with different light in order to form an electrostatic latent image on the photoreceptor drum 22 of the image forming sections 20Y, 20M, 20C, and 20K of each color.

The toner image on the front surface of the photoreceptor drum 22 is primarily transferred to the intermediate transfer belt 30.

The transfer section 32 transfers the toner image primarily transferred onto the intermediate transfer belt 30 onto the front surface of the sheet S at a secondary transfer position.

The fixing device 34 heats and pressurizes the toner image transferred to the sheet S to fix the toner image onto the sheet S.

The reversing unit 6 reverses the sheet S to form an image on the back surface of the sheet S. The reversing unit 6 reverses the sheet S discharged from the fixing device 34 by switchback. The reversing unit 6 conveys the reversed sheet S toward the registration roller 18.

The sheet S on which the image is formed and which is discharged is placed on the discharge tray 7. The image forming apparatus 1 has a discharge structure inside a frame in which the discharge tray 7 is below the scanner unit 2.

The control panel 8 is a part of an input section through which an operator inputs information for operating the image forming apparatus 1. The control panel 8 has a touch panel and various hard keys.

The control section 9 controls each member of the image forming apparatus 1.

Figure 2:
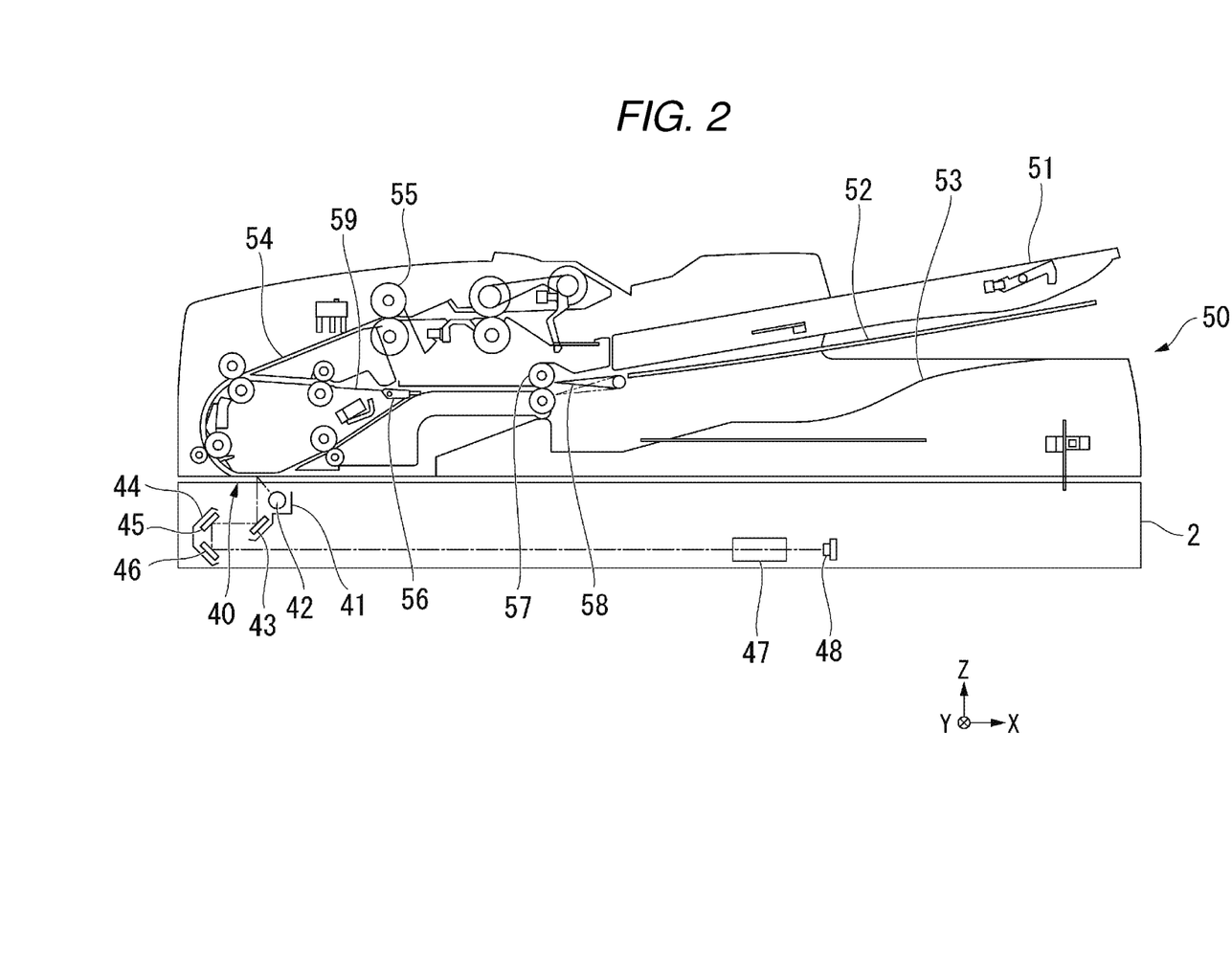
FIG. 2 is a schematic configuration view of an automatic both-surface document feeding device and a scanner unit.

FIG. 2 is a schematic configuration view of an automatic both-surface document feeding device and the scanner unit. The scanner unit 2 includes a first carriage 41, a second carriage 44, and a first image reading section 48. The first carriage 41 has an exposure bulb 42 and a first mirror 43. The second carriage 44 has a second mirror 45 and a third mirror 46. The first image reading section 48 may be a charge coupled device (CCD) sensor.

The exposure bulb 42 irradiates a document, which is a copy target, with light. Reflected light from the document is incident on the first image reading section 48 via the first mirror 43, the second mirror 45, the third mirror 46 and a lens 47. The first image reading section 48 reads the image information of the document as the brightness and darkness of light. When the document is placed on the upper surface of the scanner unit 2, the first carriage 41 moves in the X direction to scan the entire surface of the document. In order to keep the focal length constant, the moving distance of the second carriage 44 is half the moving distance of the first carriage 41.

There is a case where an automatic document feeding device such as an automatic both-surface document feeding device or both-surface simultaneous document feeding device is mounted above the scanner unit 2. The automatic document feeding device conveys the document to a reading position 40 which is at the end portion of the scanner unit 2 in the −X direction. The scanner unit 2 reads the image information of the document passing through the reading position 40 without moving the first carriage 41 and the second carriage 44.

An automatic both-surface document feeding device (reverse automatic document feeder: RADF) 50 will be described. The RADF 50 conveys the document by the switchback method such that the front surface and the back surface of the document, which is the copy target, pass through the reading position 40 of the scanner unit 2. The RADF 50 has a document tray 51, a document reversing tray 52, a document paper discharge tray 53, a paper discharge gate 56, and a reversing flapper 58.

The document disposed on the document tray 51 is taken into a main conveyance path 54. The registration roller 55 disposed in the main conveyance path 54 adjusts the inclination of the document. The document is conveyed to the reading position 40 of the scanner unit 2 through the main conveyance path 54. The scanner unit 2 reads the image signal of the front surface of the document passing through the reading position 40.

The paper discharge gate 56 is rotated upward, and the reversing flapper 58 is rotated downward. The document that passes through the reading position 40 is conveyed by a reversing paper discharge roller 57 and advances to the document reversing tray 52. The paper discharge gate 56 rotates downward, and the reversing paper discharge roller 57 reverses. The document enters a reversing conveyance path 59 from the document reversing tray 52. The document is supplied to the main conveyance path 54 again in a front and back reversed state. The scanner unit 2 reads the image signal of the back surface of the document passing through the reading position 40.

The paper discharge gate 56 rotates upward, and the reversing flapper 58 rotates upward. The document that passes through the reading position 40 is conveyed by the reversing paper discharge roller 57 and discharged to the document paper discharge tray 53. The scanner unit 2 generates image signals of the front surface and back surface of the document and outputs the image signals to the image forming unit 3. The image forming unit 3 performs both-surface printing for forming images on both the front surface and the back surface of the sheet S.

Figure 3:
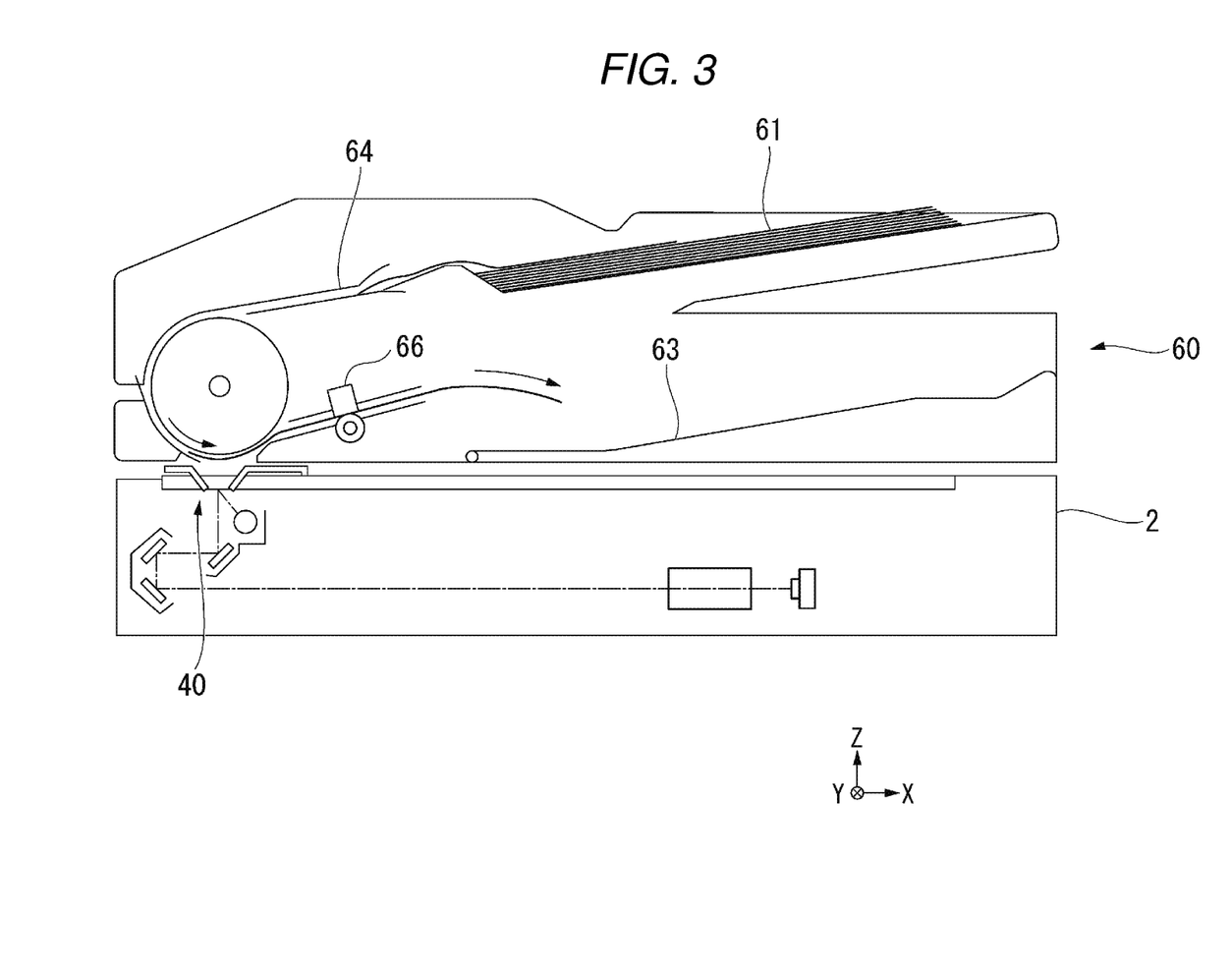
FIG. 3 is a schematic configuration view of a both-surface simultaneous document feeding device.

FIG. 3 is a schematic configuration view of the both-surface simultaneous document feeding device. A both-surface simultaneous document feeding device (dual scan document feeder: DSDF) 60 will be described. The DSDF 60 conveys the document such that the surface of the document passes through the reading position 40 of the scanner unit 2. The DSDF 60 reads the image information of the back surface of the document by the second image reading section 66. The DSDF 60 has a document tray 61, a document paper discharge tray 63, and a second image reading section 66.

The second image reading section 66 has a light source, a lens, and an image sensor which are integrated with each other. The second image reading section 66 is on the downstream side of the reading position 40 of the scanner unit 2 in the conveying direction of a main conveyance path 64 of the document. The second image reading section 66 is on the opposite side of the reading position 40 of the scanner unit 2 with the main conveyance path 64 interposed therebetween.

The document disposed on the document tray 61 is taken into the main conveyance path 64. The document is conveyed to the reading position 40 of the scanner unit 2 through the main conveyance path 54. The scanner unit 2 reads the image signal of the front surface of the document passing through the reading position 40. The scanner unit 2 generates an image signal of the front surface of the document and outputs the image signal to the image forming unit 3.

The document that passes through the reading position 40 is conveyed to the second image reading section 66. The second image reading section 66 reads the image signal of the back surface of the document. The DSDF 60 generates an image signal of the back surface of the document and outputs the image signal to the image forming unit 3. The document that passes through the second image reading section 66 is discharged to the document paper discharge tray 63.

Figure 4:
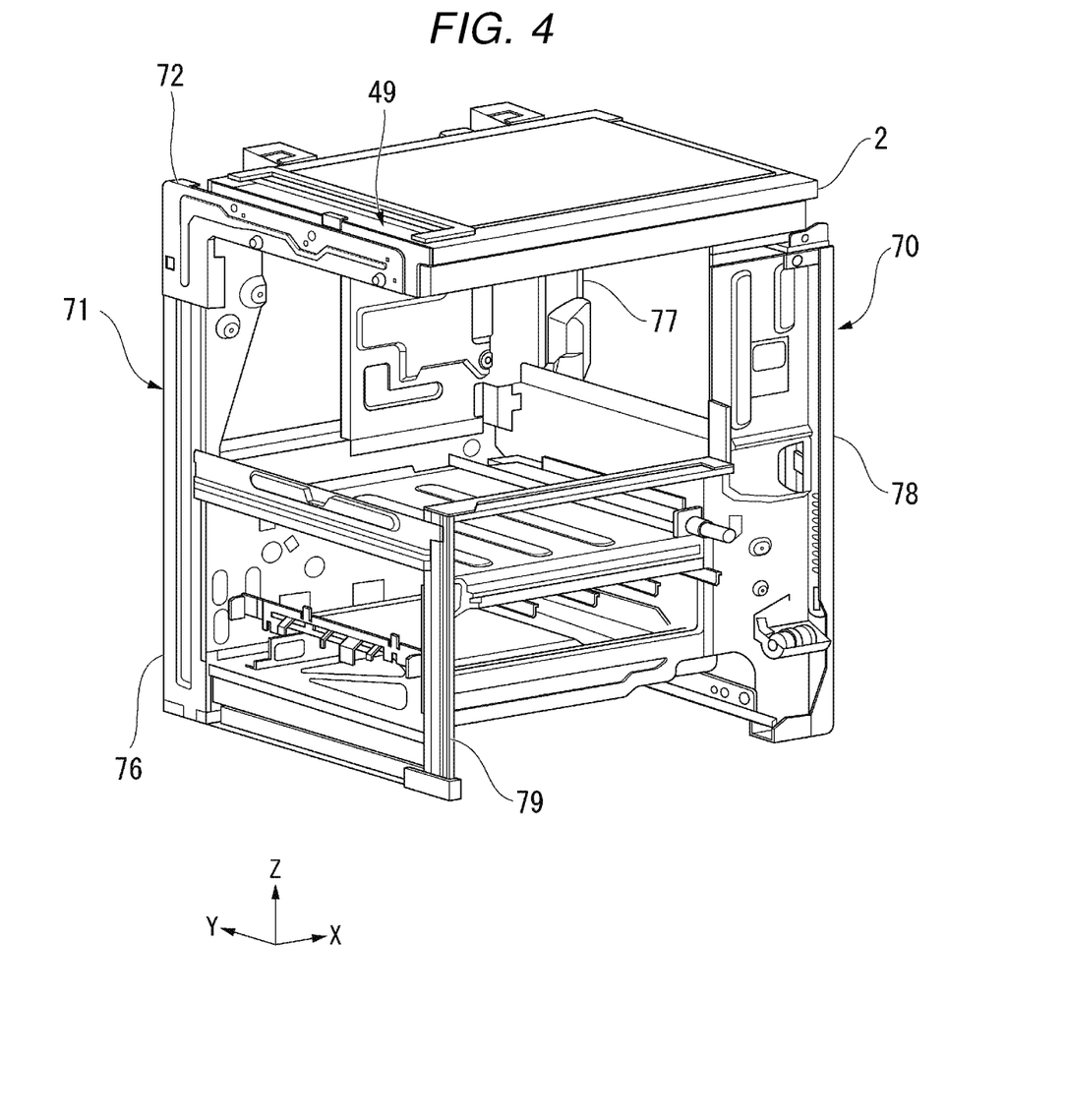
FIG. 4 is a perspective view of a frame unit.

FIG. 4 is a perspective view of a frame unit. A frame unit 70 is inside the housing 10 (refer to FIG. 1). The frame unit 70 supports the configuration members of the image forming apparatus 1. The frame unit 70 has a first frame 71 and a second frame 72.

The first frame 71 is a main body frame. The first frame 71 includes supports 76 to 79 that are long in the Z direction. The scanner unit 2 has a rectangular shape when viewed from above. The supports 76 to 79 are at positions that correspond to the four corners of the scanner unit 2. The corner portion of the scanner unit 2 in the −X direction and the −Y direction is a first corner portion 49. The image forming apparatus 1 has a discharge structure inside a frame in which the discharge tray 7 is below the scanner unit 2. The sheet S discharged onto the discharge tray 7 is taken out from below the first area of the scanner unit 2. The first area is close to the first corner portion 49. In order to make it easy to take out the sheet S, there is no support column immediately below the first corner portion 49. The support 79 of the first corner portion 49 is only below the discharge tray 7. The support 79 does not directly support the scanner unit 2.

The second frame 72 is a top frame in the +Z direction of the first frame 71. The second frame 72 is long in the Y direction. The end portion of the second frame 72 in the +Y direction is fixed to the support 76 which is at the corner portion in the −X direction and the +Y direction.

Figure 5:
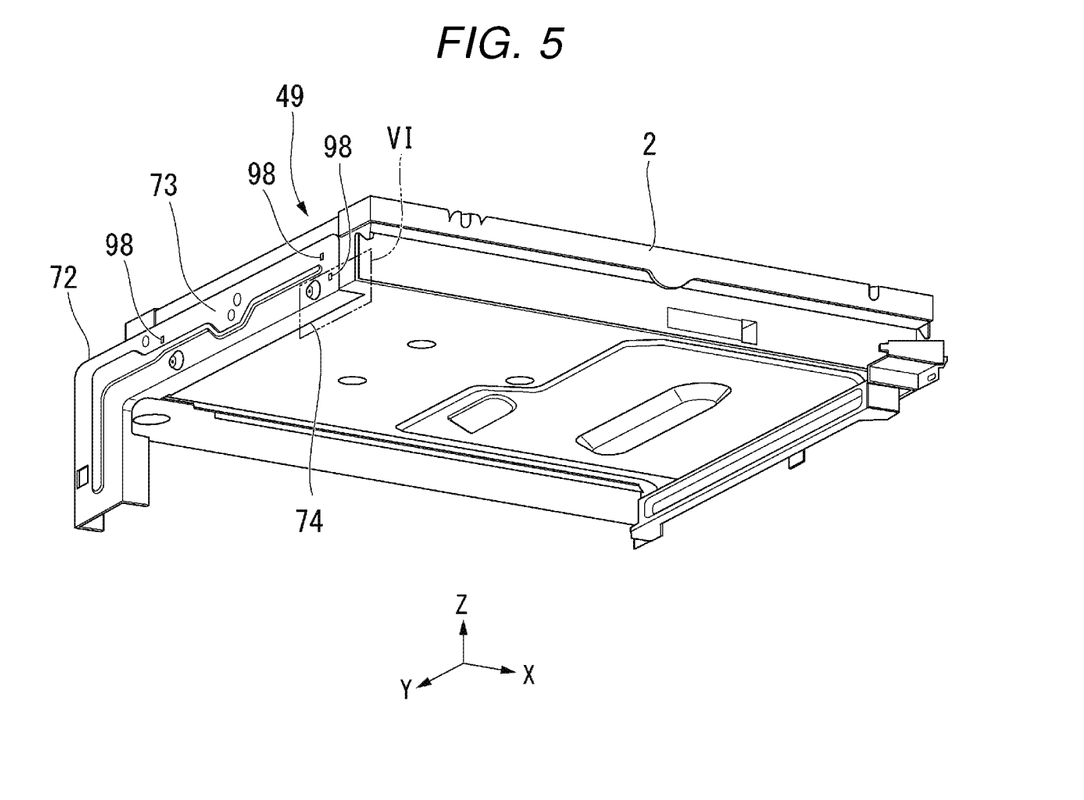
FIG. 5 is a perspective view of the scanner unit and a second frame.

FIG. 5 is a perspective view of the scanner unit and the second frame. The second frame 72 has a first plate 73 and a second plate 74 which are integrally formed. The first plate 73 extends along the end surface of the scanner unit 2 in the −X direction. The second plate 74 is along the bottom surface of the scanner unit 2 in the −Z direction. The second frame 72 is fixed to the scanner unit 2 by a fixing member 98. The fixing member 98 may be a plurality of screws screwed into the scanner unit 2 through the through-holes of the first plate 73. The second frame 72 supports the scanner unit 2.

Figure 6:
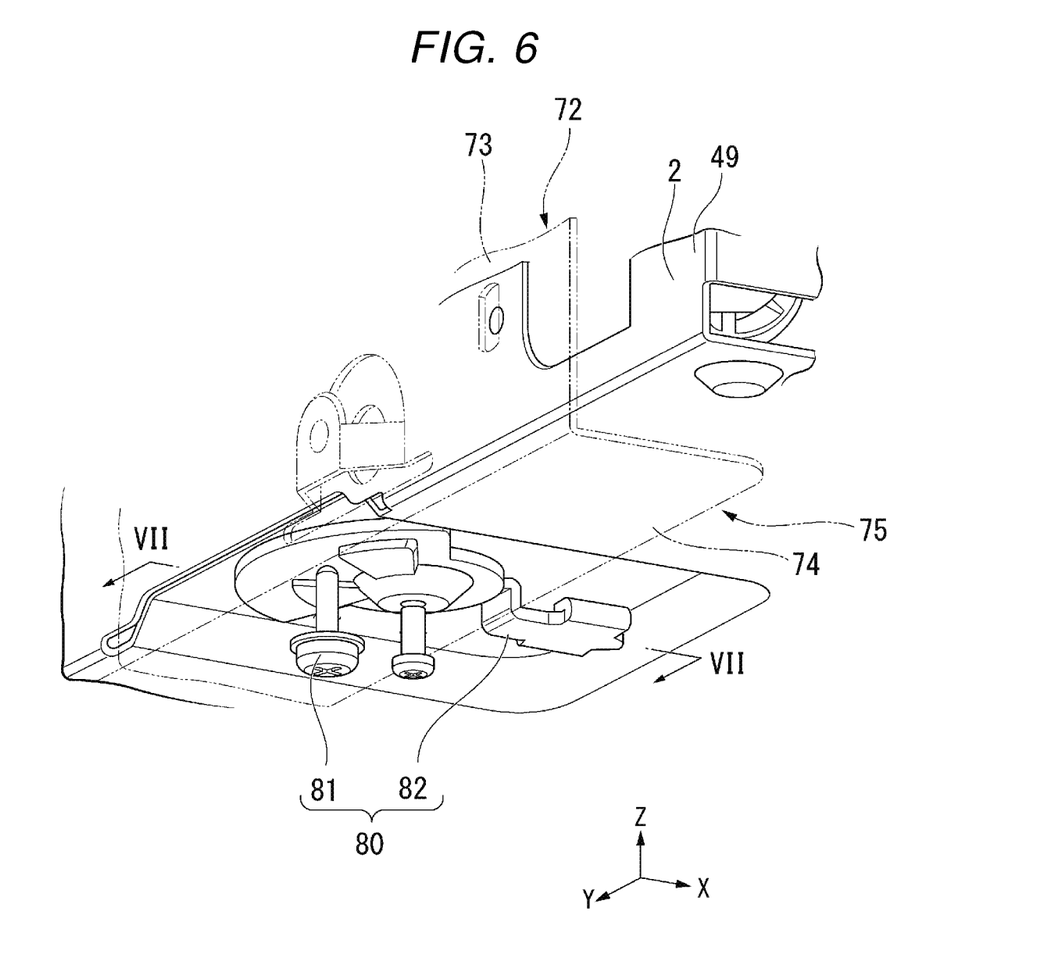
FIG. 6 is an enlarged view of a VI part of FIG. 5.

FIG. 6 is an enlarged view of a VI part of FIG. 5. In FIG. 6, the second frame 72 is described by a two-dot chain line. The end portion of the second frame 72 in the −Y direction is near the first corner portion 49 of the scanner unit 2. The second plate 74 of the second frame 72 has an auxiliary support section 75 below the first corner portion 49. The auxiliary support section 75 supports the scanner unit 2 from below the first corner portion 49.

The image forming apparatus 1 includes an adjustment mechanism 80 that adjusts a first distance in the Z direction between the first corner portion 49 of the scanner unit 2 and the auxiliary support section 75 of the second frame 72. The adjustment mechanism 80 has a first adjustment mechanism and a second adjustment mechanism.

Figure 7:
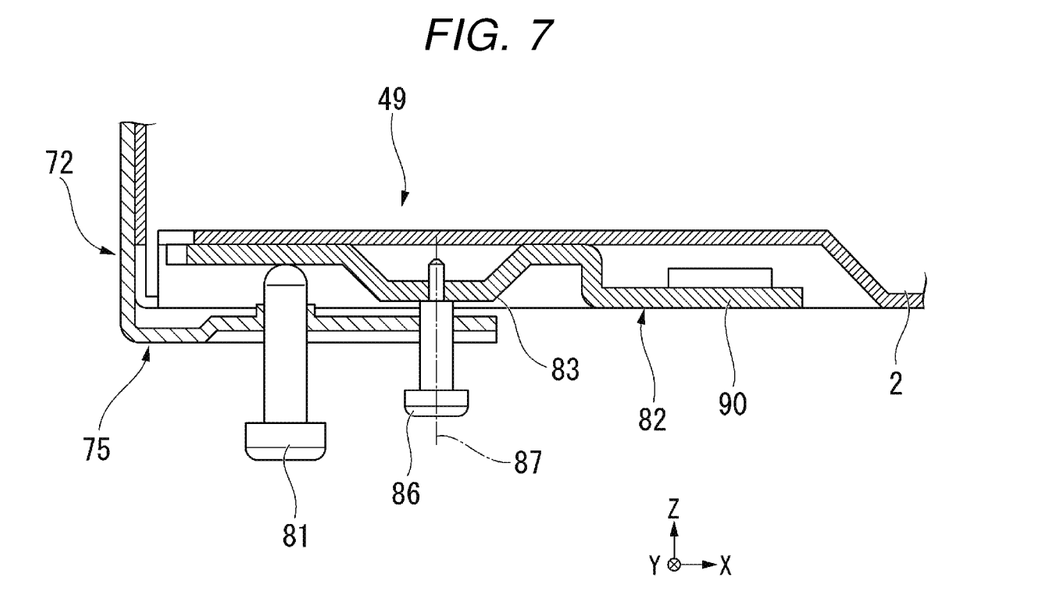
FIG. 7 is a sectional view taken along line VII-VII of FIG. 6.

FIG. 7 is a sectional view taken along line VII-VII of FIG. 6.

The first adjustment mechanism steplessly adjusts the first distance. The first adjustment mechanism may be a screw member 81. The screw member 81 is long in the Z direction. The screw member 81 is screwed to the first member which is one of the scanner unit 2 and the second frame 72. The first member may be an auxiliary support section 75 of the second frame 72. The head portion of the screw member 81 is exposed in the −Z direction of the auxiliary support section 75. When the head portion of the screw member 81 is rotated, the distal end of the screw member 81 moves in the ±Z direction with respect to the auxiliary support section 75.

The second adjustment mechanism gradually adjusts the first distance. The second adjustment mechanism may be a spacer unit 82. The spacer unit 82 has a spacer plate 83 and a stepped screw 86.

The spacer plate 83 is formed of a steel plate material or the like. The spacer plate 83 is provided between the second member, which is the other one of the scanner unit 2 and the second frame 72, and the distal end of the screw member 81. The second member may be the first corner portion 49 of the scanner unit 2. Between the auxiliary support section 75 of the second frame 72 and the first corner portion 49 of the scanner unit 2, the distal end of the screw member 81 and the spacer unit 82 are arranged in series.

The stepped screw 86 is long in the Z direction. The stepped screw 86 passes through the through-hole of the auxiliary support section 75 of the second frame 72. The distal end of the stepped screw 86 is screwed and fixed to the spacer plate 83. The spacer unit 82 is movable in the ±Z direction with respect to the auxiliary support section 75. The center axis of the stepped screw 86 along the Z direction is a rotation axis 87 of the spacer unit 82. The spacer unit 82 is rotatable around the rotation axis 87 with respect to the auxiliary support section 75.

The spacer plate 83 has a lever 90. The lever 90 is in the +X direction of the stepped screw 86. The lever 90 is exposed in the +X direction of the auxiliary support section 75 of the second frame 72. When the lever 90 is rotated around the rotation axis 87, the spacer plate 83 is rotated.

Figure 8:
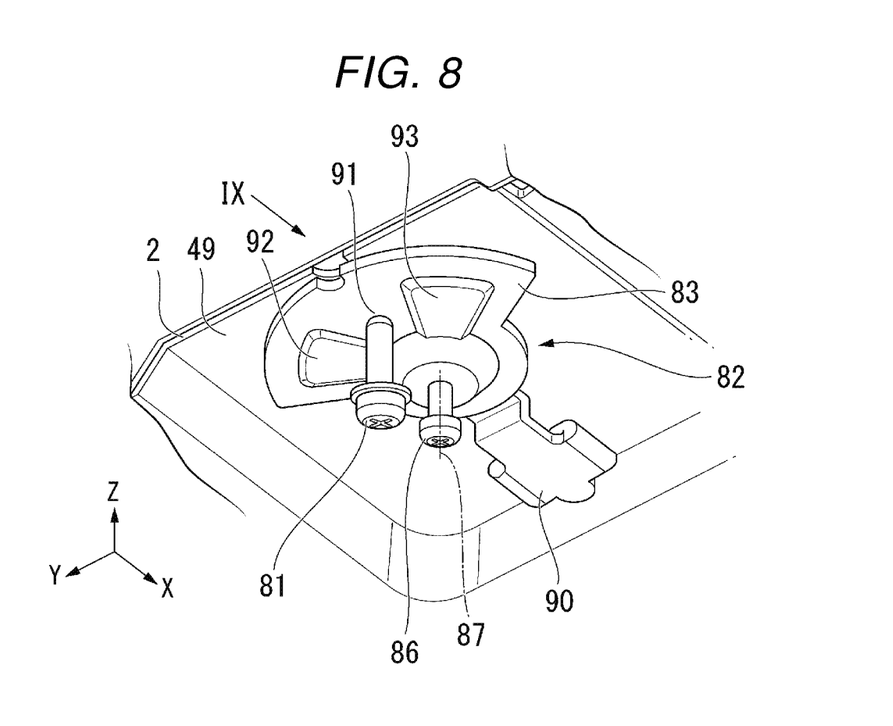
FIG. 8 is a perspective view of an adjustment mechanism in a first state.

FIG. 8 is a perspective view of the adjustment mechanism in a first state. In each of FIGS. 8 to 11, the description of the second frame 72 is omitted. The spacer plate 83 has a first spacer portion 91, a second spacer portion 92, and a third spacer portion 93. The first spacer portion 91, the second spacer portion 92, and the third spacer portion 93 are arranged in the circumferential direction of the rotation axis 87.

The first spacer portion 91 is on the opposite side of the lever 90 with the stepped screw 86 interposed therebetween. The height of the first spacer portion 91 in the Z direction is equal to the thickness of the steel plate material of the spacer plate 83.

The second spacer portion 92 and the third spacer portion 93 interpose the first spacer portion 91 in the circumferential direction of the rotation axis 87 therebetween. The second spacer portion 92 and the third spacer portion 93 are formed by deforming the steel plate material of the spacer plate 83 to be uneven in the Z direction. The height of the second spacer portion 92 in the Z direction is higher than that of the first spacer portion 91. The height of the third spacer portion 93 in the Z direction is higher than that of the second spacer portion 92.

A method of adjusting the height of the first corner portion 49 will be described.

As illustrated in FIG. 7, the first corner portion 49 of the scanner unit 2 is supported by the second frame 72, but is not directly supported by the support 79 (refer to FIG. 4). There is a case where the first corner portion 49 of the scanner unit 2 bends (hangs down) in the −Z direction. When the scanner unit 2 is not horizontal, the image reading quality of the scanner unit 2 will deteriorate. In order to make the scanner unit 2 horizontal, the height adjustment of the first corner portion 49 is performed.

For example, in a production factory of the image forming apparatus 1, a platen cover is mounted on the upper surface of the scanner unit 2. Since the platen cover is formed in a thin plate shape, the weight of the platen cover is small. The height adjustment of the first corner portion 49 is performed in a state where the platen cover is mounted. For example, the image forming apparatus 1 is shipped from a production factory to a sales office.

There is a case where the purchaser of the image forming apparatus 1 desires to mount an automatic document feeding device (RADF 50 or DSDF 60) instead of the platen cover. According to the desire of the purchaser, at the sales office, the automatic document feeding device is mounted instead of the platen cover. The weight of the automatic document feeding device is greater than that of the platen cover. The height adjustment of the first corner portion 49 is performed in a state where the automatic document feeding device is mounted.

A method of adjusting the height of the first corner portion 49 when the platen cover is mounted will be described.

Figure 9:
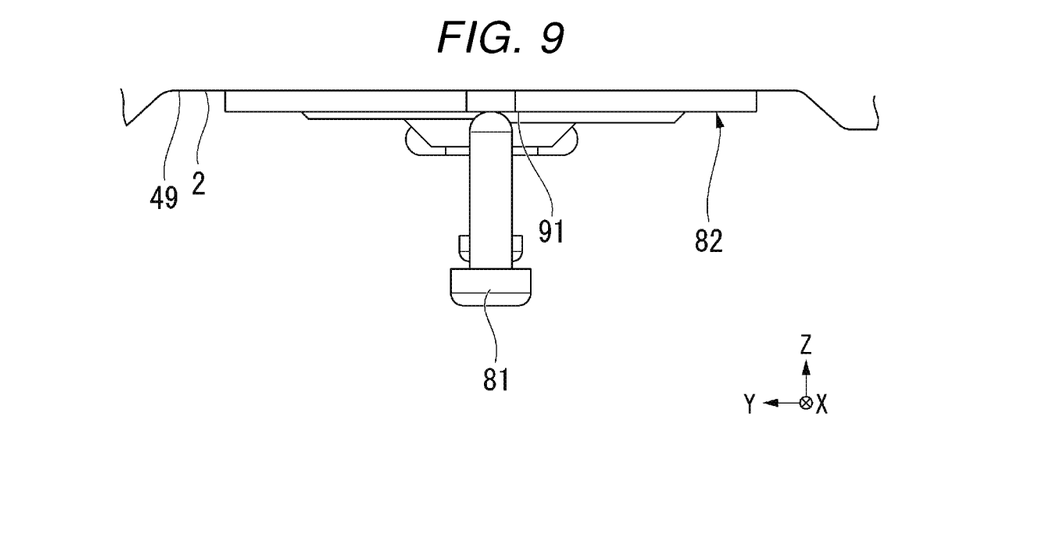
FIG. 9 is a view taken in the direction of arrow IX of FIG. 8.

The platen cover is mounted on the upper surface of the scanner unit 2. The fixing member 98 (refer to FIG. 5) that fixes the scanner unit 2 and the second frame 72 is removed, and the height adjustment of the first corner portion 49 becomes possible by the adjustment mechanism 80. FIG. 8 is a perspective view of the adjustment mechanism in a first state. FIG. 9 is a view taken in the direction of arrow IX of FIG. 8. The first spacer portion 91 of the spacer unit 82 is between the distal end of the screw member 81 and the scanner unit 2. When the first spacer portion 91 is between the scanner unit 2 and the distal end of the screw member 81, the scanner unit 2 is more horizontal than that when the second spacer portion 92 is between the scanner unit 2 and the distal end of the screw member 81.

It is determined whether or not the first corner portion 49 is bent in the −Z direction. Whether or not the first corner portion 49 is bent is determined by the amount of distortion in the image read by the scanner unit 2. When it is determined that the first corner portion 49 is bent, the height adjustment of the first corner portion 49 by the screw member 81 is performed. When the head portion of the screw member 81 is rotated, the distal end of the screw member 81 moves in the +Z direction with respect to the auxiliary support section 75. The first distance in the Z direction between the auxiliary support section 75 and the first corner portion 49 becomes large. The first corner portion 49 is lifted in the +Z direction, and the bending amount of the first corner portion 49 is reduced. The height adjustment of the first corner portion 49 by the screw member 81 is repeated until it is determined that the first corner portion 49 is not bent. Finally, the fixing member 98 fixes the scanner unit 2 and the second frame 72.

Figure 10:
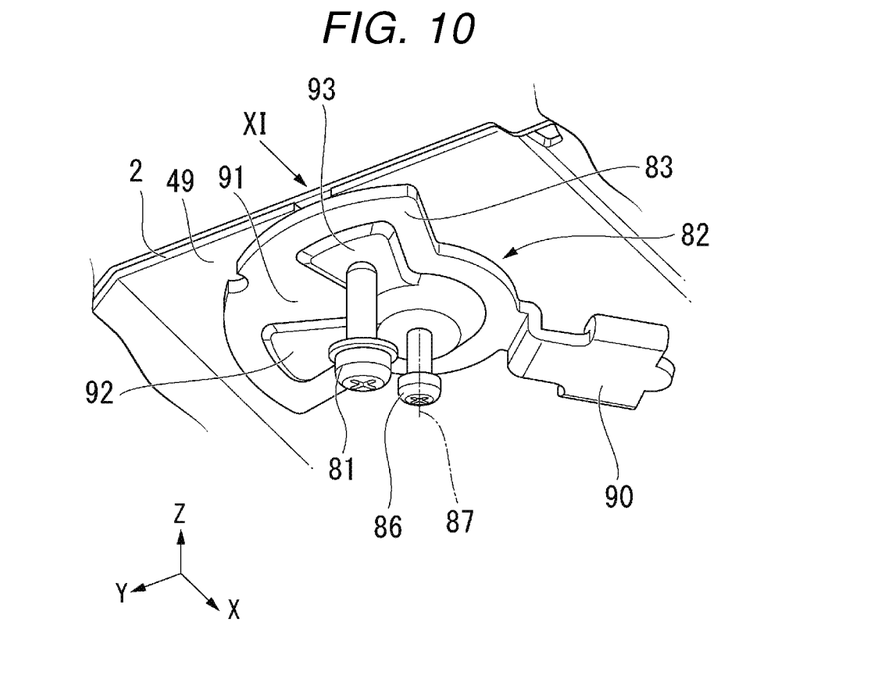
FIG. 10 is a perspective view of the adjustment mechanism in a second state.
Figure 11:
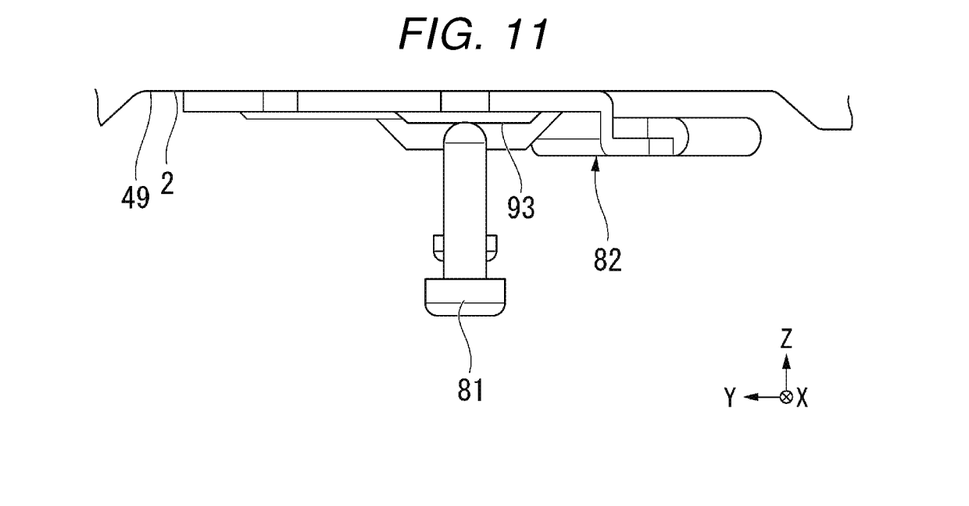
FIG. 11 is a view taken in the direction of arrow XI of FIG. 10.

A method of adjusting the height of the first corner portion 49 when the DSDF 60 (refer to FIG. 3) of the automatic document feeding device is mounted will be described. FIG. 10 is a perspective view of the adjustment mechanism in a second state. FIG. 11 is a view taken in the direction of arrow XI of FIG. 10.

The DSDF 60 is mounted above the scanner unit 2. The weight of the DSDF 60 is greater than that of the platen cover. When the DSDF 60 is mounted instead of the platen cover, the first corner portion 49 of the scanner unit 2 bends in the −Z direction together with the second frame 72.

The fixing member 98 is removed, and the height adjustment of the first corner portion 49 becomes possible. By operating the lever 90 of the spacer unit 82, the spacer unit 82 is rotated around the rotation axis 87. The third spacer portion 93 of the spacer unit 82 moves between the distal end of the screw member 81 and the scanner unit 2. When the third spacer portion 93 is between the scanner unit 2 and the distal end of the screw member 81, the scanner unit 2 is more horizontal than that when the second spacer portion 92 is between the scanner unit 2 and the distal end of the screw member 81. The height of the third spacer portion 93 in the Z direction is higher than that of the first spacer portion 91. The first distance in the Z direction between the auxiliary support section 75 and the first corner portion 49 becomes large. The first corner portion 49 is lifted in the +Z direction, and the bending amount of the first corner portion 49 is reduced. The height difference in the Z direction between the third spacer portion 93 and the first spacer portion 91 is set to the difference in the bending amount of the first corner portion 49 when the DSDF 60 is mounted instead of the platen cover. Finally, the fixing member 98 fixes the scanner unit 2 and the second frame 72.

The method of adjusting the height of the first corner portion 49 when the RADF 50 (refer to FIG. 2) is mounted is the same as that when the DSDF 60 is mounted. The weight of the RADF 50 is less than the DSDF 60. The bending amount of the first corner portion 49 when the RADF 50 is mounted is smaller than that when the DSDF 60 is mounted. The second spacer portion 92 of the spacer unit 82 is disposed between the distal end of the screw member 81 and the scanner unit 2. When the second spacer portion 92 is between the scanner unit 2 and the distal end of the screw member 81, the scanner unit 2 is more horizontal than that when the first spacer portion 91 is between the scanner unit 2 and the distal end of the screw member 81. The height difference in the Z direction between the second spacer portion 92 and the first spacer portion 91 is set to the difference in the bending amount of the first corner portion 49 when the RADF 50 is mounted instead of the platen cover.

When the automatic document feeding device is mounted, the height adjustment of the first corner portion 49 is performed by the spacer unit 82. On the other hand, the height adjustment of the first corner portion 49 may be performed by the spacer unit 82 and the screw member 81. Specifically, after the height adjustment by the spacer unit 82 is performed, the fine adjustment by the screw member 81 is performed. The fine adjustment by the screw member 81 is repeated until it is determined that the first corner portion 49 is not bent.

As described above in detail, the image forming apparatus 1 according to the embodiment includes the scanner unit 2, the image forming unit 3, the first frame 71, the second frame 72, the first adjustment mechanism, and the second adjustment mechanism. The scanner unit 2 has the first image reading section 48. The image forming unit 3 forms an image read by the scanner unit 2. The first frame 71 supports the scanner unit 2 and the image forming unit 3. The second frame 72 is fixed to the first frame 71. The second frame 72 has the auxiliary support section 75 disposed below the first area of the scanner unit 2. The first adjustment mechanism steplessly adjusts the distance in the Z direction between the first area and the auxiliary support section 75. The second adjustment mechanism gradually adjusts the distance in the Z direction between the first area and the auxiliary support section 75.

The scanner unit 2 has a rectangular shape when viewed from the Z direction. The first area is close to the first corner portion 49 of the scanner unit 2.

When the automatic document feeding device is not mounted on the scanner unit 2, the height adjustment of the first corner portion 49 is performed by the first adjustment mechanism. When the automatic document feeding device is mounted on the scanner unit 2, the height adjustment of the first corner portion 49 is performed by the second adjustment mechanism. The bending of the first corner portion 49 is suppressed, and the distortion of the image read by the scanner unit 2 is suppressed. Such a structure suppresses deterioration of image quality of the image forming apparatus. It is not necessary to adjust the distortion of the read image by adjusting the angle of the mirror of the scanner unit 2. It is not necessary to adjust the distortion of the read image by adjusting the angle of the registration roller of the automatic document feeding device.

The first adjustment mechanism has the screw member 81. The second adjustment mechanism has the spacer unit 82. The screw member 81 is screwed to the first member which is one of the scanner unit 2 and the second frame 72. The spacer unit 82 is disposed between the second member, which is the other one of the scanner unit 2 and the second frame 72, and the distal end of the screw member 81.

The first member is the second frame 72. The second member is the scanner unit 2.

According to this structure, the first adjustment mechanism and the second adjustment mechanism can be realized at low cost. Since the first adjustment mechanism and the second adjustment mechanism are arranged in series, it is possible to perform the height adjustment of the first corner portion 49 by using both the first adjustment mechanism and the second adjustment mechanism together.

The spacer unit 82 has the first spacer portion 91, the second spacer portion 92, and the third spacer portion 93. The second spacer portion 92 has a higher height in the Z direction than that of the first spacer portion 91. The third spacer portion 93 has a higher height in the Z direction than that of the second spacer portion 92.

When the automatic document feeding device is not mounted, the first spacer portion 91 is disposed between the scanner unit 2 and the distal end of the screw member 81.

The image forming apparatus 1 further includes the RADF 50. At this time, the second spacer portion 92 is disposed between the scanner unit 2 and the distal end of the screw member 81.

The image forming apparatus 1 further includes the DSDF 60. The DSDF 60 has the second image reading section 66 different from the first image reading section 48. At this time, the third spacer portion 93 is disposed between the scanner unit 2 and the distal end of the screw member 81.

According to these structures, the height of the first corner portion 49 of the scanner unit 2 is appropriately adjusted according to the presence and type of the automatic document feeding device.

The spacer unit 82 is rotatable around the rotation axis 87 along the Z direction. The first spacer portion 91, the second spacer portion 92, and the third spacer portion 93 are arranged side by side in the circumferential direction of the rotation axis 87.

According to this structure, the first spacer portion 91, the second spacer portion 92, and the third spacer portion 93 can be switched by rotating the spacer unit 82.

The fixing member 98 for fixing the relative position of the scanner unit 2 and the second frame 72 in the Z direction, is further provided.

According to this structure, the scanner unit 2 can be held after the height of the first corner portion 49 is adjusted.

According to at least one embodiment described above, the first adjustment mechanism that steplessly adjusts the distance in the Z direction between the first corner portion 49 and the auxiliary support section 75, and the second adjustment mechanism that gradually adjusts the distance, are provided. Accordingly, it is possible to suppress deterioration of the image quality of the image forming apparatus.

While certain embodiments have been described these embodiments have been presented by way of example only, and are not intended to limit the scope of the inventions. Indeed, the novel embodiment described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
    a scanner having an image reading section;
    an image forming unit that forms an image read by the scanner on a sheet;
    a frame including a first support section that supports the image forming unit and a second support section positioned below the scanner;
    a first adjustment mechanism that steplessly adjusts a distance in an up-down direction between the scanner and the second support section; and
    a second adjustment mechanism that gradually adjusts the distance in the up-down direction between the scanner and the second support section,
    wherein the first adjustment mechanism includes a screw member,
    wherein the second adjustment mechanism includes a spacer, and
    wherein the spacer is between the scanner and a distal end of the screw member.

2. The image forming apparatus according to claim 1,
    wherein the screw member comes into contact with the second support section, and
    wherein the spacer comes into contact with the scanner.

3. The image forming apparatus according to claim 1,
    wherein the spacer includes a first spacer portion and a second spacer portion having a higher height in the up-down direction than that of the first spacer portion.

4. The image forming apparatus according to claim 3,
    wherein, when the first spacer portion is between the scanner and the distal end of the screw member, the scanner is more horizontal than that when the second spacer portion is between the scanner and the distal end of the screw member.

5. The image forming apparatus according to claim 3, further comprising:
    an automatic both-surface document feeding device on the scanner,
    wherein, when the second spacer portion is between the scanner and the distal end of the screw member, the scanner is more horizontal than that when the first spacer portion is between the scanner and the distal end of the screw member.

6. The image forming apparatus according to claim 3, further comprising:
    a both-surface simultaneous document feeding device different from the image reading section on the scanner,
    wherein the spacer has a third spacer portion having a higher height in the up-down direction than that of the second spacer portion, and
    wherein, when the third spacer portion is between the scanner and the distal end of the screw member, the scanner is more horizontal than that when the second spacer portion is between the scanner and the distal end of the screw member.

7. The image forming apparatus according to claim 6,
wherein the spacer is rotatable around a rotation axis along the up-down direction, and
wherein the first spacer portion, the second spacer portion, and the third spacer portion are arranged side by side in a circumferential direction of the rotation axis.

8. The image forming apparatus according to claim 1,
wherein the scanner has a rectangular shape when viewed from above, and
wherein the second support section is close to a first corner portion of the scanner.

9. The image forming apparatus according to claim 1, further comprising:
a fixing member that fixes a relative position of the scanner and the second support section in the up-down direction.

10. The image forming apparatus according to claim 1,
wherein the second adjustment mechanism gradually adjusts the distance in a stepwise manner.

11. A method of forming a high resolution image in an image forming apparatus comprising a scanner having an image reading section, an image forming unit, and a frame including a first support section that supports the image forming unit and a second support section positioned below the scanner, comprising:
steplessly adjusting a distance in an up-down direction between the scanner and the second support section using a screw member; and
gradually adjusting the distance in the up-down direction between the scanner and the second support section using a spacer, wherein the spacer is between the scanner and a distal end of the screw member.

12. The method according to claim 11,
wherein gradually adjusting the distance is performed in a stepwise manner.

13. An image enhancing device for an image forming apparatus, the image forming apparatus comprising a scanner having an image reading section, an image forming unit, and a frame including a first support section that supports the image forming unit and a second support section positioned below the scanner, comprising:
a first adjustment mechanism that steplessly adjusts a distance in an up-down direction between the scanner and the second support section; and
a second adjustment mechanism that gradually adjusts the distance in the up-down direction between the scanner and the second support section;
wherein the first adjustment mechanism includes a screw member,
wherein the second adjustment mechanism includes a spacer, and
wherein the spacer is between the scanner and a distal end of the screw member.

14. The image enhancing device according to claim 13,
wherein the screw member comes into contact with the second support section, and
wherein the spacer comes into contact with the scanner.

15. The image enhancing device according to claim 13,
wherein the spacer includes a first spacer portion and a second spacer portion having a higher height in the up-down direction than that of the first spacer portion.

16. The image enhancing device according to claim 15,
wherein, when the first spacer portion is between the scanner and the distal end of the screw member, the scanner is more horizontal than that when the second spacer portion is between the scanner and the distal end of the screw member.

17. The image enhancing device according to claim 15, further comprising:
an automatic both-surface document feeding device on the scanner,
wherein, when the second spacer portion is between the scanner and the distal end of the screw member, the scanner is more horizontal than that when the first spacer portion is between the scanner and the distal end of the screw member.

18. The image enhancing device according to claim 15, further comprising:
a both-surface simultaneous document feeding device different from the image reading section on the scanner,
wherein the spacer has a third spacer portion having a higher height in the up-down direction than that of the second spacer portion, and
wherein, when the third spacer portion is between the scanner and the distal end of the screw member, the scanner is more horizontal than that when the second spacer portion is between the scanner and the distal end of the screw member.

* * * * *